(12) United States Patent
Karthaeuser et al.

(10) Patent No.: US 7,597,336 B2
(45) Date of Patent: Oct. 6, 2009

(54) INTEGRATION OF AN ELECTRONIC AIR SUSPENSION SYSTEM IN AN ELECTRONIC AIR PROCESSING SYSTEM

(75) Inventors: Klaus Karthaeuser, Grossbottwar (DE); Roland Klement, Haunshofen (DE)

(73) Assignee: Knorr-Bremse Systems fuer Nutzfahrzeuge GmbH, Munich (DE)

( * ) Notice: Subject to any disclaimer, the term of this patent is extended or adjusted under 35 U.S.C. 154(b) by 585 days.

(21) Appl. No.: 11/016,771

(22) Filed: Dec. 21, 2004

(65) Prior Publication Data

US 2005/0212248 A1    Sep. 29, 2005

(30) Foreign Application Priority Data

Dec. 23, 2003    (DE) ................... 103 60 881

(51) Int. Cl.
*B60G 9/04*    (2006.01)
(52) U.S. Cl. .............................. 280/124.157
(58) Field of Classification Search ......... 280/124.157, 280/124.158, 124.159, 124.16, 124.161, 280/5.5
See application file for complete search history.

(56) References Cited

U.S. PATENT DOCUMENTS

| | | | |
|---|---|---|---|
| 5,369,584 A | 11/1994 | Kajiwara | |
| 5,678,900 A * | 10/1997 | Blanz | 303/6.01 |
| 6,332,623 B1 | 12/2001 | Behmenburg et al. | |
| 6,823,251 B1 | 11/2004 | Giers | |
| 6,829,893 B2 * | 12/2004 | Doerr et al. | 60/605.1 |
| 7,194,345 B2 * | 3/2007 | Heer | 701/36 |
| 2005/0017474 A1 * | 1/2005 | Heer | 280/124.16 |

FOREIGN PATENT DOCUMENTS

| | | |
|---|---|---|
| DE | 40 39 005 A1 | 6/1991 |
| DE | 43 05 958 A1 | 9/1994 |
| DE | 198 22 529 A1 | 12/1997 |
| DE | 197 16 197 A1 | 10/1998 |
| DE | 198 35 491 A1 | 2/2000 |
| DE | 199 05 172 A1 | 8/2000 |

* cited by examiner

*Primary Examiner*—Faye M. Fleming
(74) *Attorney, Agent, or Firm*—Crowell & Moring LLP

(57) ABSTRACT

A combined central control unit is provided for an air suspension system and/or an air processing system. The air suspension system has an electronic control system characterized in that the electronic control system is integrated in the electronic control of the air processing system. Similarly, an air processing system has an electronic control system characterized in that the electronic control system is integrated in the electronic control of the air suspension system.

15 Claims, No Drawings

INTEGRATION OF AN ELECTRONIC AIR SUSPENSION SYSTEM IN AN ELECTRONIC AIR PROCESSING SYSTEM

BACKGROUND AND SUMMARY OF THE INVENTION

The invention relates to an air suspension system having an electronic control system, an air processing system having an electronic control system, as well as a control unit for an air suspension system and/or an air processing system.

Electronic air suspension systems, also called electronic level control systems, and electronic air processing systems, which are each controlled by a separate system-inherent electronic control system, are known.

The system electronics of the air suspension systems of commercial vehicles according to the prior art are accommodated in their own electronic control unit, which is housed in the driver's cab of the commercial motor vehicle. In the historical development, this was found to be expedient because the electronic control unit does not have to be sealed-off in the cab in a splash-proof manner and can be directly operated by way of a remote control. This, however, necessarily leads to the requirement that connection cables have to extend from the driver's cab to the control elements of the air suspension system. In the case of modern commercial motor vehicles, the engine is frequently arranged below the driver's cab. In order to obtain access to the engine, the driver's cab as a rule—at least in the case of the newer trucks—can be tilted by way of a pivot joint, so that the engine and the transmission line are freely accessible. In this case, the cable connection has to be led through by way of the pivot joint.

The disadvantages of this arrangement are the necessarily large cable length and the limited available space for the cable lead-through in the pivot joint. The control unit of the air suspension system requires its own housing and its own electronic components, such as protective circuits for the power supply.

It is object of the invention to reduce the cabling expenditures and to lower the system costs by reducing the individual structural members.

This object is achieved by an air suspension system having an electronic control system wherein the electronic control system is integrated in an electronic control of an air processing system, by an air processing system having an electronic control system wherein the electronic control system is integrated in an electronic control of an air suspension system, or by a control unit for an air suspension system and/or an air processing system, wherein the control unit combines the control electronics of the air suspension system and the electronic control of the air processing system as the central control unit.

As a result of the combination of the electronic control system of the air suspension system and the electronic control system of the air processing system in a central control unit, both controls can be accommodated in only one housing, and several electronic components, such as the power supply, the communication driver, the sensor analyzing circuit, etc., can serve a dual purpose. Likewise, hardware storage systems for the control electronics of the air suspension system and the electronic control of the air processing system can be utilized simultaneously. Various control software can be used in a freely programmable computer and, as a result, components of the control unit can be used for the two purposes, that of the air suspension system and that of the air processing system.

In an advantageous embodiment of the invention, all control signals for the air suspension system and the air processing system are guided out of the control unit by way of a bipolar cable. The cable feed-through in the pivot joint can thereby be implemented in a space-saving manner. In the case of a construction as a twisted cable, a so-called "twisted pair", an interfering electromagnetic coupling-in can be minimized even when the cable length is relatively large, which is required in the case of a semitrailer.

Preferably, the system information for the air suspension system and the air processing system is transmitted by way of a CAN bus interface. In this manner, different information in a standardized system can be transmitted by way of a bipolar cable.

The control unit is advantageously constructed such that different control software can be used in a freely programmable computer. This offers a maximum of flexibility.

The electronic control system of the air suspension system and the electronic control system of the air processing system preferably have a logic structure in their control programs, which are decoupled such that both control programs can be changed separately, particularly during a software update. In this manner, the two systems are largely independent on the software side.

The electronic control system of the air suspension system and the electronic control system of the air processing system preferably have a remote control connected directly to the control unit. The cabling expenditures are thereby minimized.

In a preferred embodiment of the invention, the electronic control system of the air suspension system and the electronic control system of the air processing system have an interface, which is established such that, in the case of vehicles without an electronic air processing system, the components of the air suspension system can be used without any modification. This ensures a high flexibility of the usage possibilities while minimizing the variety of components.

In a preferred embodiment of the invention, an electronic parking brake can be integrated in the air processing system. In this manner, electronic components, such as the power supply, the communication driver, the sensor analyzing circuit, etc., are also utilized for the electronic parking brake.

In a preferred embodiment of the invention, a pressure sensor of an air suspension system can be integrated in the air processing system. This has the advantage of a compact construction.

The invention claimed is:

1. An air suspension system, comprising:
   an electronic control system for the air suspension system;
   an electronic control of an air processing system; and
   wherein the electronic control system for the air suspension system is integrated in the electronic control of the air processing system having at least one of a common communication driver and sensor analyzing circuit.

2. An air processing system, comprising:
   an electronic control system for an air processing system;
   an electronic control of an air suspension system; and
   wherein the electronic control system of the air processing system is integrated in the electronic control of the air suspension system having at least one of a common communication driver and sensor analyzing circuit.

3. A control unit for at least one of an air suspension system and an air processing system, comprising:
   first control electronics of the air suspension system;
   second control electronics of the air processing system; and wherein the control unit has integrated therein as a central control unit the first and second control electronics and at least one of a common communication driver and sensor analyzing circuit.

4. The control unit according to claim 3, wherein all control signals for the air suspension system and the air processing system are guided out of the control unit by way of a bipolar cable.

5. The control unit according to claim 3, wherein system information for the air suspension system and the air processing system is transmitted by way of a CAN bus interface.

6. The control unit according to claim 4, wherein system information for the air suspension system and the air processing system is transmitted by way of a CAN bus interface.

7. The control unit according to claim 3, wherein the control unit is constructed such that various control software is useable in a freely programmable computer.

8. A control unit for at least one of an air suspension system and an air processing system, comprising:
   first electronic control system of the air suspension system; and
   second electronic control system of the air processing system,
   the control unit having integrated therein as a central control unit the first and the second electronic control systems, wherein the first electronic control system of the air suspension system and the second electronic control system of the air processing system have a logic structure in their respective control programs which are decoupled such that the two control programs are changeable separately, and wherein the control unit includes at least one of a common communication driver and sensor analyzing circuit.

9. The control unit according to claim 3, wherein the first electronic control system of the air suspension system and the second electronic control system of the air processing system have a remote control connected directly to the control unit.

10. The control unit according to claim 3, wherein the first electronic control system of the air suspension system and the second electronic control system of the air processing system have an interface which is established such that, in a case of vehicles without an electronic air processing system, components of the air suspension system are useable without any modification.

11. An air processing system, comprising:
   an electronic control system for an air processing system; and
   an electronic control of an air suspension system,
   wherein the electronic control system of the air processing system is integrated in the electronic control of the air suspension system, and
an electronic parking brake is integrated in the air processing system.

12. The air suspension system according to claim 1, wherein at least one pressure sensor of the air suspension system is integrated in the air processing system.

13. The air processing system according to claim 2, wherein at least one pressure sensor of the air suspension system is integrated in the air processing system.

14. The air processing system according to claim 11, wherein at least one pressure sensor of the air suspension system is integrated in the air processing system.

15. A motor vehicle, comprising:
   an air suspension system; and
   an air processing system;
   wherein at least one pressure sensor of the air suspension system is integrated in the air processing system, and wherein at least one of a common communication driver and sensor analyzing circuit is integrated in the air processing system.

* * * * *